(12) United States Patent
Lambert et al.

(10) Patent No.: US 9,129,717 B2
(45) Date of Patent: Sep. 8, 2015

(54) EUV EXCITATION LIGHT SOURCE WITH A LASER BEAM SOURCE AND A BEAM GUIDE DEVICE FOR MANIPULATING THE LASER BEAM

(71) Applicant: Trumpf Laser- und Systemtechnik GmbH, Ditzingen (DE)

(72) Inventors: Martin Lambert, Korb (DE); Joachim Schulz, Gerlingen (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 29 days.

(21) Appl. No.: 13/837,770

(22) Filed: Mar. 15, 2013

(65) Prior Publication Data
US 2013/0327963 A1    Dec. 12, 2013

(30) Foreign Application Priority Data
Jun. 12, 2012  (DE) .......................... 10 2012 209 837

(51) Int. Cl.
| | | |
|---|---|---|
| G21K 5/04 | (2006.01) | |
| G02B 27/09 | (2006.01) | |
| G02B 27/10 | (2006.01) | |
| H05G 2/00 | (2006.01) | |
| B23K 26/067 | (2006.01) | |
| H01S 3/23 | (2006.01) | |
| H01S 3/00 | (2006.01) | |

(52) U.S. Cl.
CPC .............. *G21K 5/04* (2013.01); *B23K 26/0676* (2013.01); *H05G 2/005* (2013.01); *H05G 2/008* (2013.01); *H01S 3/005* (2013.01); *H01S 3/2391* (2013.01)

(58) Field of Classification Search
USPC ................. 250/504 R, 365, 372, 578.1, 526; 356/488, 494, 498, 499, 614; 359/584, 359/587, 618, 629, 634
See application file for complete search history.

(56) References Cited

U.S. PATENT DOCUMENTS

| | | | |
|---|---|---|---|
| 5,166,504 A | 11/1992 | Protz et al. | |
| 6,704,090 B2 * | 3/2004 | Nishi | 355/53 |
| 6,973,164 B2 | 12/2005 | Hartlove et al. | |
| 7,447,137 B2 * | 11/2008 | Morishima | 369/116 |
| 8,681,427 B2 * | 3/2014 | Bergstedt et al. | 359/634 |
| 2001/0055103 A1 * | 12/2001 | Nishi | 355/53 |
| 2004/0036940 A1 * | 2/2004 | Hazelton et al. | 359/223 |
| 2005/0258768 A1 | 11/2005 | Gaebel et al. | |
| 2006/0215712 A1 | 9/2006 | Ziener et al. | |

(Continued)

FOREIGN PATENT DOCUMENTS

| | | |
|---|---|---|
| DE | 4123052 A1 | 3/1992 |
| DE | 102004005242 A1 | 8/2005 |

(Continued)

*Primary Examiner* — Bernard E Souw
(74) *Attorney, Agent, or Firm* — Fish & Richardson P.C.

(57) ABSTRACT

An Extreme Ultra-Violet (EUV) excitation light source has a beam guide device for manipulating at least one laser beam is provided. The beam guide device comprises at least one beam splitter for generating at least two separated beams from at least one laser beam, at least one mirror or a lens for manipulating at least one of the separated beams, a superposition mirror for superposing the at least two separated beams, and a focusing appliance for generating a respective focus for each of the at least two separated beams. At least two focuses can be generated at one identical location or at two different locations by the beam guide device.

24 Claims, 5 Drawing Sheets

(56) References Cited

U.S. PATENT DOCUMENTS

| | | | |
|---|---|---|---|
| 2006/0289410 A1* | 12/2006 | Morita et al. | 219/121.67 |
| 2010/0117009 A1 | 5/2010 | Moriya et al. | |
| 2013/0321926 A1* | 12/2013 | Bergstedt et al. | 359/634 |
| 2014/0043676 A1* | 2/2014 | Lambert | 359/350 |
| 2014/0084186 A1* | 3/2014 | Lambert et al. | 250/504 R |
| 2014/0085741 A1* | 3/2014 | Lambert | 359/859 |

FOREIGN PATENT DOCUMENTS

| | | |
|---|---|---|
| DE | 102006060998 A1 | 7/2008 |
| DE | 102009044426 A1 | 5/2010 |
| EP | 0858249 A1 | 8/1998 |
| EP | 1492394 A2 | 12/2004 |
| JP | 08213192 | 8/1996 |
| WO | WO2011162903 A1 | 12/2011 |

* cited by examiner

EUV EXCITATION LIGHT SOURCE WITH A LASER BEAM SOURCE AND A BEAM GUIDE DEVICE FOR MANIPULATING THE LASER BEAM

CROSS REFERENCE TO RELATED APPLICATION

Under 35 U.S.C. §119(a), this application claims the benefit of a foreign priority application filed in Germany, serial number 10 2012 209 837.2, filed Jun. 12, 2012, the entire contents of which are hereby incorporated by reference.

TECHNICAL FIELD

The invention relates to an Extreme Ultra-Violet (EUV) excitation light source with a laser beam source and a beam guide device for manipulating the laser beam.

BACKGROUND

Document WO 2011/162903 shows a laser exciting a target material in an appropriate manner to operate as an Extreme Ultra-Violet (EUV) excitation light source. For improving the efficiency of the generation of the EUV light droplets of the target material are struck by a so-called "pre-pulse" and are enlarged, converted into a gas, vaporized or converted into weak plasma. Then the target material prepared by the pre-pulse is converted into plasma by a so-called main-pulse" and emits EUV light. Typically, different lasers are used as light sources for the pre-pulse and for the main-pulse which are introduced into a common amplifier on a common beam path.

The different lasers can also emit light having different wavelengths, wherein, when using several lasers, the laser beams with the different wavelengths are focused on focuses on an axis of the laser beam in different distances due to chromatic aberrations.

SUMMARY

In certain application, the current disclosure provides an EUV excitation light source enabling at least one laser beam to be manipulated such that different focuses of the laser beam located at different locations are generated.

By dividing one laser beam in several separated beams by a beam guide device and by manipulating at least one of the separated beams of the laser beam, it is possible to generate several focuses of a laser beam in a predetermined distance at a predetermined location, respectively, wherein the predetermined locations can be different with respect to the three spatial coordinates. Thereby, for an EUV radiation generation, a focus or a focal point for a pre-pulse can be adjusted such that it is different from a focus of a main-pulse. Thus, a target material being prepared by the pre-pulse at a first location can be irradiated optimally at a second optimum location in its trajectory being determined by a start direction, a start velocity, gravity and a deflection by the pre-pulse in order to strike and to excite a droplet of the target material.

An EUV excitation light source has a beam guide device for manipulating at least one laser beam. The beam guide device comprises at least one beam splitter for generating at least two separated beams from at least one laser beam, at least one mirror or a lens for manipulating at least one of the separated beams, a superposition mirror for superposing the at least two separated beams, and a focusing appliance for generating a respective focus for each of the at least two separated beams. At least two focuses can be generated at one identical location or at two different locations by the beam guide device.

In some embodiments, the beam splitter can be a partially transparent mirror comprising a coating being reflective for a proportion of the at least one laser beam and being transparent for a further proportion of the at least one laser beam. At least one of the mirrors can be flat, or curved. The at least one beam splitter, the at least one mirror or the at least one lens, the superposition mirror and the focusing appliance can be designed and arranged such that the focus of one of the at least two separated beams is located at a predetermined location, or can be designed and arranged such that a first focus of one of the separated beams is located at another location than the second focus of the other of the separated beams. The first focus and the second focus can be located on a line transverse with respect to optical axes of the separated beams that are generating the focuses. At least one of the beam splitter, the superposition mirror, and the focusing appliance can be made of diamond.

In further embodiments, at least one first enclosed space can be delimited at least by one of the beam splitters and the superposition mirror and the EUV excitation light source comprises a device for adjusting a predetermined pressure in the first enclosed space, wherein a curvature of the beam splitter and/or of the superposition mirror is modified by a modification of the predetermined pressure. At least one second enclosed space can be delimited by at least one of the mirrors and the EUV excitation light source comprises a device for adjusting a predetermined pressure in the second enclosed space is provided, wherein a curvature of the at least one of the mirrors is modified by a modification of the predetermined pressure. The beam splitter can be a partially transparent mirror comprising a filtering coating that is transmitting for a first wavelength range and is reflecting for a second wavelength range. Two laser beam sources can emit laser beams having different wavelengths.

In some embodiments, the beam splitter is a partially transparent mirror comprising a filtering coating that is reflective for one condition of polarization of the at least one laser beam, wherein a reflected separated beam is generated, and is transmitting for another condition of polarization of the at least one laser beam and a transmitted separated beam occurs. The laser beam impinging on the beam splitter and the separated beam generated at the beam splitter can be arranged in a first plane, and at least two mirrors or lenses are arranged such that a reflected separated beam manipulated by the mirrors or lenses impinging on the superposition mirror and the separated beam reflected at the superposition mirror are arranged in a second plane, and the first plane and the second plane are perpendicular with respect to each other. Included can be at least two laser beam sources, wherein the laser beam sources emit laser beams having different polarizations, which can be controllable separately from each other. The beam guide device is configured to modify a direction of the at least one laser beam, or a divergence of the at least one laser beam.

In some embodiments, a method for generating separated beams using an EUV excitation light source comprises detecting time-dependent locations of a target material for a pre-pulse and for a main-pulse, adjusting the beam guide device such that the respective focus of the two separated beams is located at the time-dependent locations, controlling the laser beam source such that the at least one laser beam generates a first focus and a second focus at a time in which the target material is located in the time-dependent location for the pre-pulse and the main-pulse. The time-dependent locations can be determined empirically and the time-dependent locations adjusted fixedly by the beam guide device. Alternatively, the time-dependent locations can be determined during operation of the EUV excitation light source and the beam guide device and the at least one laser beam source is controlled by a control device.

By using an EUV excitation light source of the type described herein at least one laser beam is advantageously manipulated such that different focuses of the laser beam located at different locations are generated.

The invention is elucidated by embodiments referring to the attached drawings.

DETAILED DESCRIPTION

Figure 1:
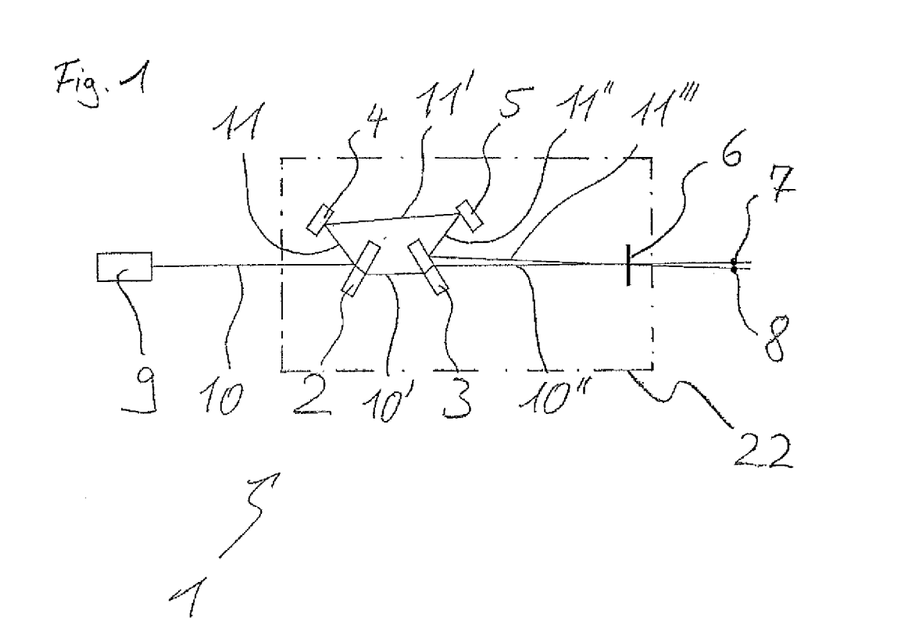
FIG. 1 shows an illustration in principle of an EUV excitation light source with a first embodiment of a beam guide device having flat mirrors for manipulating a reflected separated beam of a laser beam of a laser beam source.

FIG. 1 shows a first embodiment of an EUV excitation light source 1 with a beam guide device 22 for manipulating a laser beam 10. Manipulating means an alteration of a direction and/or an alteration of a divergence of a laser beam. The beam guide device 22 comprises a beam splitter 2, a first mirror 4, a second mirror 5 and a superposition mirror 3. Furthermore, a lens is provided as a focusing appliance 6 in the beam guide device 22.

The beam splitter 2 is provided with partially transparent coatings in this embodiment. Thereby, a laser beam 10 impinging on the beam splitter 2 is divided and a transmitted separated beam 10' and a reflected separated beam 11 are generated. The first mirror 4 and the second mirror 5 are designed flat or even and they reflect completely the incident light. The superposition mirror 3 is provided with coatings matching the coatings of the beam splitter 2. Thereby, the superposition mirror 3 operates in a transmitting way for laser beams impinging on one side of the superposition mirror and in a reflecting way for laser beams impinging on the other side. The focusing appliance 6 is designed as a lens and it generates a focus 7, 8 of a laser beam 10", 11''' impinging on the lens. The focusing appliance 6 can alternatively be designed as a mirror or a system of several optical members.

In alternative embodiments, depending on the geometrical or optical specifications, only one mirror 4 or more than two mirrors 4, 5 are provided.

Transmitting members, as e.g., the beam splitter 2, the superposition mirror 3 and the focusing appliance 6 can be made of diamond. Thereby, it is ensured that the transmitted beam is not or only slightly influenced by thermal effects. Alternatively, another suitable material may be used. In principle, ZnSe is suitable as substrate; however, in this case, a considerable divergence alteration in the transmitted beam is to be expected.

For generating the laser beam 10, a laser beam source 9, e.g., a $CO_2$-laser, is provided. The laser beam source 9 is controlled by a control device (not shown) such that laser beam pulses having a wavelength in the infrared spectrum are emitted. The laser beam source 9 comprises a seed-laser and amplifier stages. Alternatively, as described below, several seed-lasers can also be provided, the laser beams of which are amplified in common amplifier stages or, alternatively, in separate amplifier stages.

The laser beam 10 impinges on the beam splitter 2, it is divided there, and the first transmitted separated beam 10' and the first reflected separated beam 11 are generated. The relationship between the intensity of the first transmitted separated beam 10' and the intensity of the first reflected separated beam 11 depends on the coatings of the beam splitter 2. Usually, a power distribution is determined such that the power of the transmitted separated beam is about 10% to 30% of the power of the reflected separated beam.

The first transmitted separated beam 10' impinges on the superposition mirror 3 and it is transmitted by the superposition mirror 3 so that the second transmitted separated beam 10'' occurs. Then, the second transmitted separated beam 10'' impinges on the focusing appliance 6 and, there is focused onto the first focus 7.

The first reflected separated beam 11 is reflected at the first mirror 4 so that the second reflected separated beam 11' occurs. The second reflected separated beam 11' impinges on the second mirror 5 and is reflected into a third reflected separated beam 11''. The third reflected separated beam 11'' impinges on the superposition mirror 3 and, there, it is reflected into a fourth reflected separated beam 11'''. The fourth reflected separated beam 11''' impinges on the focusing appliance 6 where it is focused on the second focus 8.

In this embodiment, the laser beam source 9, the beam splitter 2, the first mirror 4, the second mirror 5 and the superposition mirror 3 are respectively designed and arranged such that the first focus 7 and the second focus 8 have the same distance from the focusing appliance 6 but they are located at different locations. The locations where the focuses 7, 8 are located here are on a line transverse with respect to an optical axis of the laser beams forming the focuses 7, 8.

Figure 2:
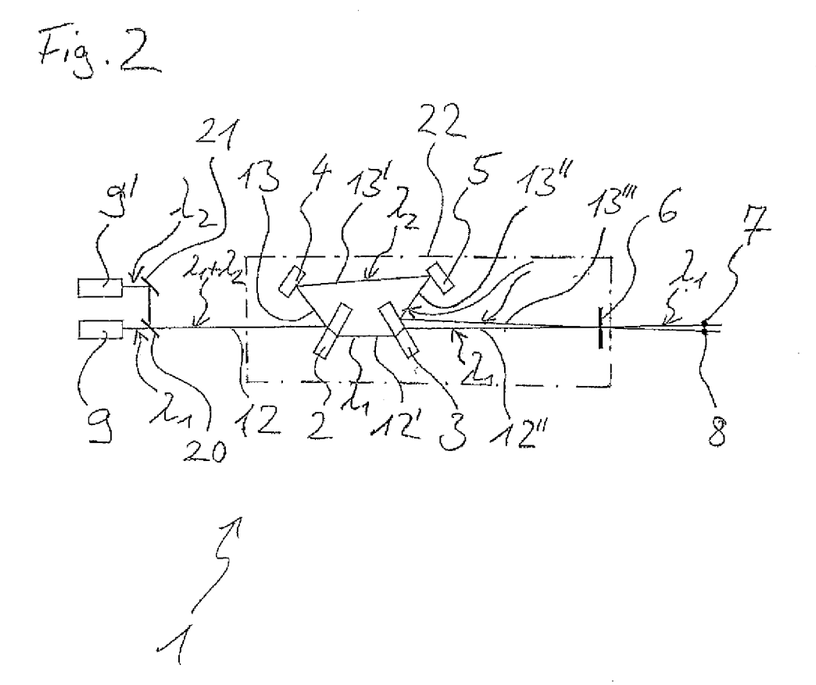
FIG. 2 shows an illustration in principle of the EUV excitation light source with a second embodiment of the beam guide device for manipulating two laser beams of a respective laser beam source.

FIG. 2 shows a second embodiment of the beam guide device 22. In this embodiment, two laser beam sources 9, 9' are provided. The laser beam source 9 differs from the laser beam source 9' in that it emits light having another wavelength. The laser beam source 9 emerges a laser beam having a first wavelength $\lambda 1$ and the laser beam source 9' emerges a laser beam having a second wavelength $\lambda 2$. The laser beams are joined by optical members 20, 21 and they form a concentric laser beam 12. Alternatively, the laser beams of the laser beam sources 9, 9' can also be directed directly to the beam splitter 2.

In this embodiment, the beam splitter 2 is designed such that it comprises a filtering coating that is reflective to one wavelength range and transmitting to another wave-length range. In this embodiment, the laser beam having the wavelength range $\lambda 1$ is transmitted and the laser beam having the wavelength range $\lambda 2$ is reflected. Thereby, the first transmitted separated beam 12' and a first reflected separated beam 13 occur.

The first transmitted separated beam 12' is transmitted by the superposition mirror 3 also coated matching to the beam splitter 2, and forms a second transmitted separated beam 12''.

The second transmitted separated beam 12" is focused by the focusing appliance 6 and yields the first focus 7.

Analogously to the first embodiment, in the second embodiment, the first reflected separated beam 13 is then also reflected at the mirrors 4 and 5 so that a second reflected separated beam 13' and a third reflected separated beam 13" occur. The third reflected separated beam 13" is then reflected into a fourth reflected separated beam 13'" onto the focusing appliance 6 by the superposition mirror 3 and is focused onto the second focus 8 by the focusing appliance 6.

By using two laser beam sources 9, 9', it is possible to generate two spatially separated focuses 7, 8 and, by an appropriate control, time-separated focuses 7, 8, wherein the spatially separated focuses can also be generated at different times.

Figure 3:
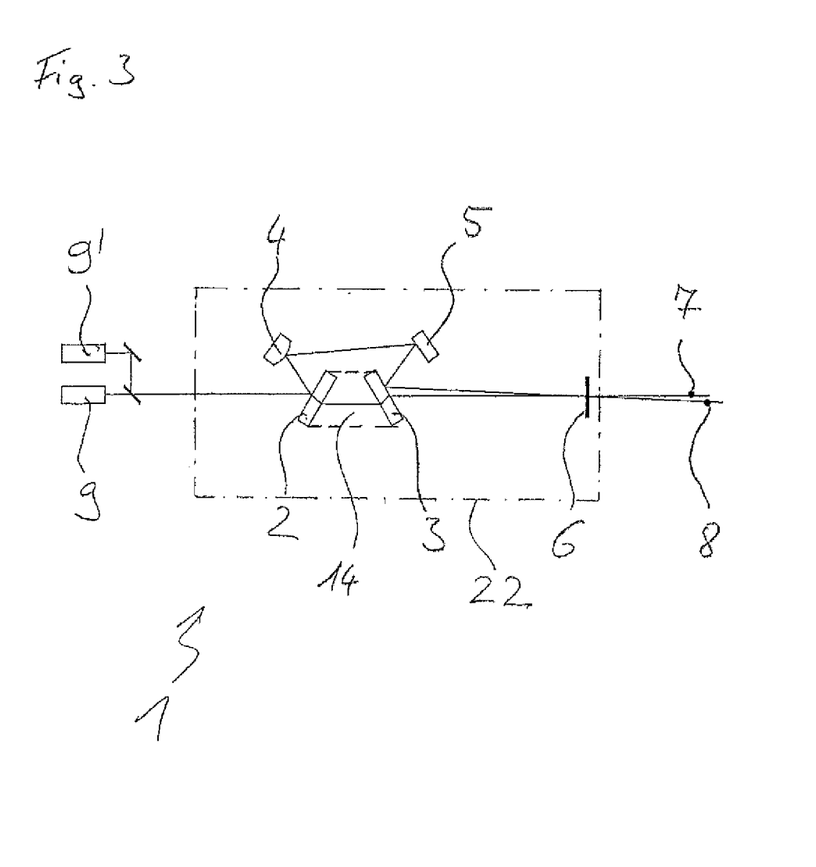
FIG. 3 shows an illustration in principle of the EUV excitation light source with a third embodiment of the beam guide device having a curved mirror.

In FIG. 3, a third embodiment of the beam guide device 22 is shown. The difference with respect to the second embodiment shown in FIG. 2 is that the first mirror 4 is not flat but curved. By the curvature of the first mirror 4, the divergence of the laser beam is modified so that the laser beam reflected by the mirrors 4, 5 impinges with a divergence different from the laser beam transmitted by the beam splitter 2 and the superposition mirror 3 so that, compared to the preceding embodiments, the second focus 8 has another (in this example, greater) distance from the focusing appliance 6. Alternatively, dependent on the curvature of the mirror, the distance between the second focus and the focusing appliance 6 can also be less.

Alternatively, the distance between the focus and the focusing appliance 6 can also vary by shifting the focus along an axis perpendicular to the optical axis of the focusing appliance 6.

In alternative embodiments, also, either only the second mirror 5 can be curved or both mirrors 4, 5 can be curved. Moreover, alternatively, it is not absolutely necessary to modify the divergence of the laser beam by curved mirrors. The modification of the divergence is also possible by other optical members, e.g., lenses, or by more than two mirrors 4, 5.

In this embodiment, the alignment of the laser beams of the laser beam sources 9, 9', through the beam splitter 2, the mirrors 4, 5 and the superposition mirror 3 determines the alignment of the laser beam after the superposition mirror 3 and thus after the focusing appliance 6. The distance between the focus and the focusing appliance 6 is determined at least by the curvature of the mirrors 4, 5. A concentric beam having different divergences of the separated beams can be generated, or (as illustrated) the separated beams can have an angle with respect to another after the superposition mirror 3. In the case of a concentric beam, depending on the divergence of the separated beams, focuses in different distances from the focusing appliance 6 can be generated on the axis of the concentric beam. In the case of separated beams having also an angle with respect to another after the focusing appliance 6, the distance between the focus and the focusing appliance 6 can be different and the location of the focus can be determined such that it does not lie on the axis of the other separated beam. Thereby, a spatial separation of the focuses with respect to another can be realized in all three spatial directions.

In a further alternative embodiment, the space between the beam splitter 2 and the superposition mirror 3 is optionally formed as a first enclosed space 14. A predetermined pressure adjustable by a device for adjusting the pressure (e.g., a controllable pressure regulator) in the first enclosed space 14 and controlled by the control device can be altered with respect to the environment. By altering the pressure with respect to the environment, the curvatures of the reflective surfaces of the beam splitter 2 and of the superposition mirror can be varied in order to modify the divergence of the reflected beam, whereby the distance between the focus and the focusing appliance 6 can be varied also during operation. Alternatively, it is also possible that only the beam splitter 2 or only the superposition mirror 3 is enclosed by the enclosed space 14.

A suitable optional motorized tilting appliance is controlled by a control device to tilt the mirrors 4, 5 by which the location of the focus 8 can also be altered during operation.

In an optional combination of the motorized tilting and the adjustment of the curvature of the mirrors, the location of the focus 8 can continuously be modified in all three spatial directions.

Alternatively with respect to the laser beams having different wavelengths $\lambda 1$ and $\lambda 2$ shown in FIG. 2, the laser beams of the laser beam sources 9 and 9' can also be polarized differently. In this case the laser beams are transmitted or reflected depending on the condition of polarization so that the respective separated beams are created. The beams having different polarizations resulting by this way are then manipulated analogously with respect to the laser beams 12, 13 shown in FIG. 2 or FIG. 3.

Figure 4:
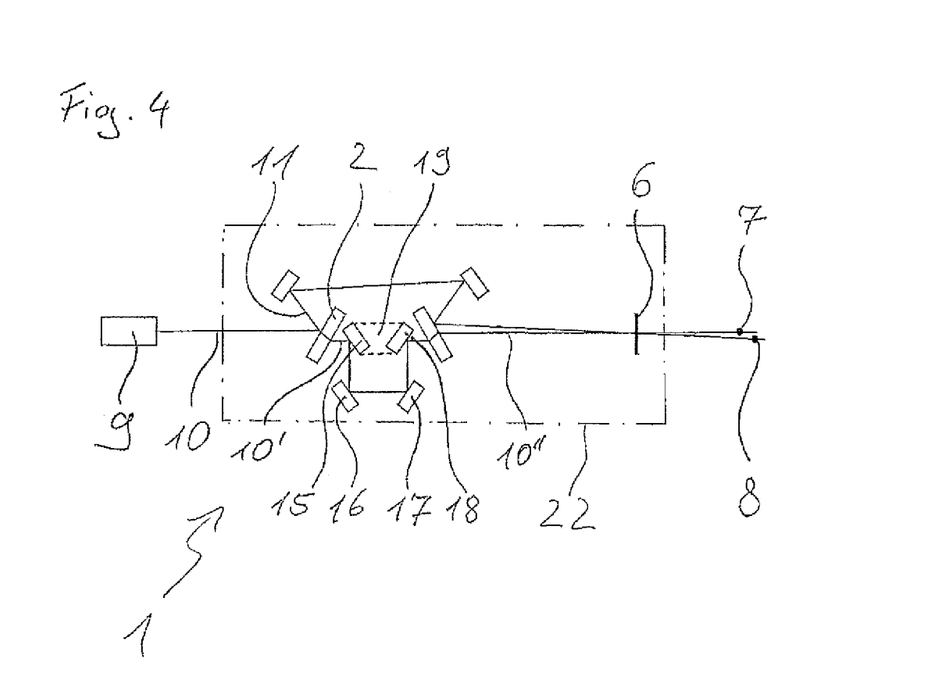
FIG. 4 shows an illustration in principle of the EUV excitation light source having a fourth embodiment of the beam guide device in which both a reflected and a transmitted separated beam are manipulated.

Shown in FIG. 4 is an embodiment of the beam guide device 22 in which both the first reflected separated beam 11 and the first transmitted separated beam 10' are manipulated before contacting the superposition mirror 3. The separated beams 10', 11 are generated by the beam splitter 2 (similarly to as shown in FIG. 1). As described above, the laser beam 10 of the laser beam source 9 (or, alternatively, of several laser beam sources 9, 9') can be separated using different characteristics of the laser beam 10.

For manipulating the first transmitted separated beam 10', here, a third mirror 15, a fourth mirror 16, a fifth mirror 17 and a sixth mirror 18 are provided. Alternatively, one or several of the mirrors 15, 16, 17, 18 can be replaced by lenses. Alternatively, four mirrors 15, 16, 17, 18 are not mandatory and another suitable quantity can be provided.

The first transmitted separated beam 10' is reflected and deflected by the third mirror 15 and the first transmitted separated beam 10' is manipulated analogously with respect to the above described embodiments. Thereby, its direction and its divergence can be modified in order to generate the first focus 7 at a predetermined location at a predetermined distance from the focusing appliance 6.

Also here, an optional second enclosed space 19 can be provided in a space between the third mirror 14 and the sixth mirror 18 (as shown) or, alternatively, between others of the mirrors 15, 16, 17, 18 or only one mirror can delimit the second enclosed space 19 is possible. In the second enclosed space 19, a predetermined pressure with respect to the environment can be adjusted and modified. Thus, the distance between the focus 7 and the focusing appliance 6 can be modified by the divergence of the separated beam 10" impinging on the focusing appliance 6.

By an optional motorized tilting of one or several of the mirrors 15, 16, 17, 18, the beam direction of the separated beam 10" impinging on the focusing appliance 6 can be adjusted and by adjusting the curvature of one or of several of the mirrors 15, 16, 17, 18, the distance between the focus 7 and the focusing appliance 6 can be adjusted and, thus, the location of the focus 7 can be adjusted.

Figure 5:
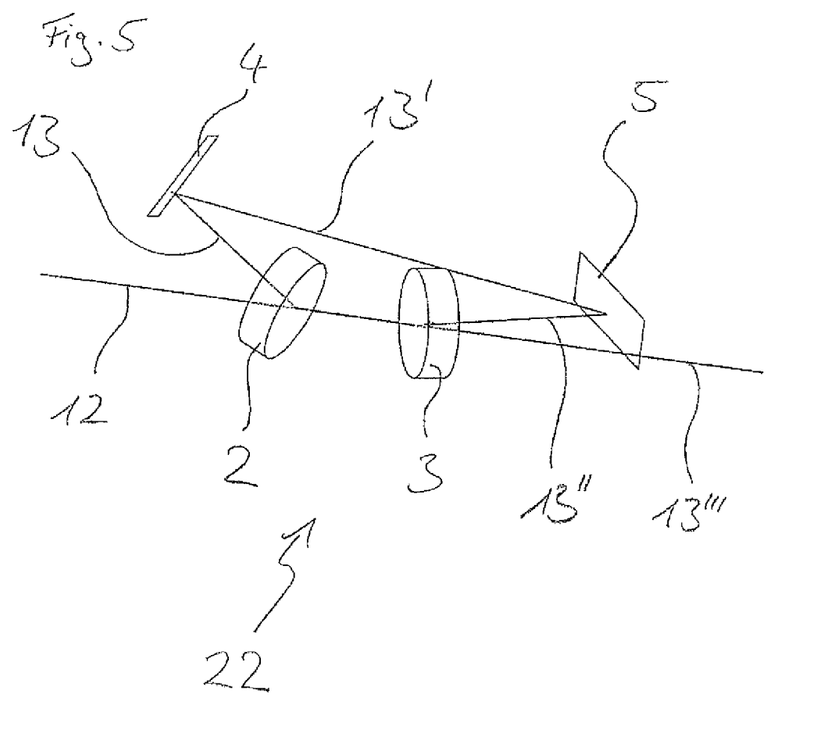
FIG. 5 shows an illustration in principle of a beam path in a beam guide device of a fifth embodiment for compensating a polarization error or a phase shifting.

FIG. 5 shows an illustration in principle of a beam path in a beam guide device 22 of a fifth embodiment in order to compensate for polarization errors or phase shifting. When the transmitted beams are not polarized in a pure linear manner, wherein one polarization plane of the linear polarized laser beam is located in the deflection plane, polarization errors occur. In the case of arbitrary polarization planes (e.g., circular polarization), a transmitted beam obtains a phase shifting of the two polarization proportions which are perpendicular and parallel with respect to the deflection plane (s-versus p-polarization) depending systematically on the coating. The symmetrical phase shifting occurs for transmitted and for reflected beams.

The beam splitter 2 in FIG. 5 is arranged such that a plane formed by the laser beam 12 and by the first reflected separated laser beam 13 is arranged perpendicular with respect to a plane formed by the third separated beam 13" reflected at the second mirror 5 and the fourth separated beam 13''' reflected at the superposition mirror 3. Thereby, it is essential that the two planes are perpendicular with respect to each other so that the p- (s-) polarization proportions of the incident laser beam 12 pass one time as p- (s-) polarization and one time as s- (p-) polarization through the two optical members 2 and 3. Therefore both polarization proportions obtain the same phase shifting so that the relative phase error is compensated. The polarization of the transmitted proportion of the laser beam 13''' or of the transmitted separated beam is also equal with respect to the polarization of the incident laser beam 12.

The systematic phase shifting also occurs for the reflected laser beams. By a suitable selection of the deflection angles at one or several of the reflecting optical members 2, 3, 4, 5 and/or by using one or several further optical members in the beam path of one or several of the reflected separated beams 13, 13' and 13" between the optical members 2 and 3, the phase shifting can also be compensated for the reflected proportion of the laser beam 13''' or for the reflected separated beam.

In use, a laser beam for generating EUV radiation is radiated by an EUV excitation light source 1. By two seed-lasers, laser beams having a wavelength $\lambda 1$ of 10.59 µm and $\lambda 2$ of 10.26 µm are respectively generated. The laser beams are superposed by a first amplifier stage and they are amplified in the amplifier stages. Then, the amplified laser beams 10 impinge on the beam splitter 2 designed such that the laser beam having the first wavelength is reflected and the laser beam having the second wavelength is transmitted. For example, the laser beam having the larger wavelength is transmitted and the laser beam having the smaller wavelength is reflected. Then, when the transmitted beam 10' impinges on the superposition mirror 3 it is transmitted and impinges on the focusing appliance 6, focusing the laser beam onto the first focus 7. The first reflected beam 11 is reflected by the mirrors 4, 5 and impinges on the superposition mirror 3 from where it is deflected to the focusing appliance 6, focusing the laser beam onto the second focus 8. The seed-laser emitting the laser beam having $\lambda$=10.26 µm is controlled such that, out of the EUV excitation light source 1, a pre-pulse striking a zinc droplet moved on a parabolic trajectory transverse with respect to the optical axis of the laser beams generating the focuses in a first focus 7 in a time-dependent position at a first location A at a first time A is emitted. The pre-pulse has an average power of about 3.5 kW. Hereby, the zinc droplet is deformed, heated and expanded. Then, the seed-laser emitting the laser beam having $\lambda$=10.59 µm is controlled such that a main-pulse is emitted. While the expanded zinc droplet moves further, it is excited by the main-pulse for plasma illumination in the second focus 8 in a time-dependent position at a second location B at a second time B. The main-pulse has an average power of 35 kW.

Light having for example 13.5 nm is generated thereby and used for exposing wafers for semiconductor production. It is essential for the generation and optimization of the generation of the EUV radiation that both, the length of time between the time A and the time B and the spatial position of the location A with respect to the location B, are determined exactly in order to excite the zinc droplet for plasma illumination. A fixed adjustment of the time-dependent locations of the focuses can be empirically determined, e.g., in advance by measurement of necessary values by manually adjusting the mirrors. Alternatively, a system for generating the EUV light containing the EUV excitation light source 1 can be provided with detection appliances for detecting the time-dependent location of the zinc droplets and the time-dependent locations of the focuses of the pre-pulse and of the main-pulse. This can occur for example by detecting an efficiency and, by the detected values, determining the time-dependent optimum locations of the focuses and transmitting them to the adjustment devices for adjusting the locations of the focuses so that the zinc droplets are struck as accurately as possible by the pre-pulse and by the main-pulse. The determination of the efficiency can also be done by a detection of the intensity of the emitted EUV light.

Alternatively, the location of the zinc droplets can also be calculated from the start time of the movement of the zinc droplets along their trajectory and from their speed if the trajectory is known.

Alternatively, the use of only one seed-laser is also possible, wherein the seed-laser beam is then deflected by an adjustable mirror. However, the distance of time between the pre-pulse and the main-pulse is very small (about 1 µs).

In an alternative version, the laser beam of a $CO_2$ laser (illustrated in FIG. 2 as 9') and of a YAG laser (illustrated in FIG. 2 as 9) are introduced into the beam guide device 22. The light of the $CO_2$ laser yielding a main power of about 35 kW and of the YAG laser yielding a power of about 500 W is directed onto a screen of quartz glass as the optical member 20. The quartz glass is reflective for the laser beam of the $CO_2$ laser and it is transmitting for the laser beam of the YAG laser. However, different from the illustration in FIG. 2, the light beam of the $CO_2$ laser can also be directed onto the optical member 20 without being deflected by the optical member 21.

The described embodiments are not limiting and they can be combined with another in order to achieve an optimum excitation of a target material for emitting the EUV light. The beam guide can alternatively include further members not being included in one of the described embodiments.

What is claimed is:

1. An Extreme Ultra-Violet (EUV) excitation light source comprising:
    at least one laser beam source for emitting at least one laser beam; and
    a beam guide device for manipulating the at least one laser beam comprising:
        at least one beam splitter for generating at least two separated beams from the at least one laser beam,
        at least one mirror or at least one lens for manipulating at least one of the separated beams,
        a superposition mirror for superposing the at least two separated beams, and
        a focusing appliance for generating a respective focus for each of the at least two separated beams,
    wherein the beam splitter, the at least one mirror or at least one lens, and the superposition mirror are arranged to compensate for polarization errors of the at least two separated beams.

2. The EUV excitation light source according to claim 1, wherein the beam splitter is a partially transparent mirror comprising a coating being reflective for a proportion of the at least one laser beam and being transparent for a further proportion of the at least one laser beam.

3. The EUV excitation light source according to claim 1, wherein at least one of the mirrors is flat.

4. The EUV excitation light source according to claim 1, wherein at least one of the mirrors is curved.

5. The EUV excitation light source according to claim 1, wherein the at least one beam splitter, the at least one mirror or the at least one lens, the superposition mirror and the focusing appliance are designed and arranged such that the focus of one of the at least two separated beams is located at a predetermined location.

6. The EUV excitation light source according to claim 1, wherein the at least one beam splitter, the at least one mirror or the at least one lens, the superposition mirror and the focusing appliance are designed and arranged such that a first focus of one of the separated beams is located at a location different from a location of a second focus of a second of the separated beams.

7. The EUV excitation light source according to claim 6, wherein the first focus and the second focus are located on a line being transverse with respect to optical axes of the separated beams that are generating the focuses.

8. The EUV excitation light source according to claim 1, wherein at least one of the beam splitter, the superposition mirror, and the focusing appliance is made of diamond.

9. The EUV excitation light source according to claim 1, wherein at least one first enclosed space is delimited at least by one of the beam splitters and the superposition mirror and the EUV excitation light source comprises a device for adjusting a predetermined pressure in the first enclosed space, wherein a curvature of the beam splitter and/or of the superposition mirror is modified by a modification of the predetermined pressure.

10. The EUV excitation light source according to claim 9, wherein at least one second enclosed space is delimited by at least one of the mirrors and the EUV excitation light source comprises a device for adjusting a predetermined pressure in the second enclosed space, wherein a curvature of the at least one of the mirrors is modified by a modification of the predetermined pressure.

11. The EUV excitation light source according to claim 1, wherein the beam splitter is a partially transparent mirror comprising a filtering coating that is transmitting for a first wavelength range and is reflecting for a second wavelength range.

12. The EUV excitation light source according to claim 11, comprising at least two laser beam sources, wherein the laser beam sources emit laser beams having different wavelengths.

13. The EUV excitation light source according to claim 12, wherein the laser beams sources are controllable separately from each other.

14. The EUV excitation light source according to claim 1, wherein the beam splitter is a partially transparent mirror comprising a filtering coating that is reflective for one condition of polarization of the at least one laser beam to generate a reflected separated beam, and is transmitting for another condition of polarization of the at least one laser beam to generate a transmitted separated beam.

15. The EUV excitation light source according to claim 14, wherein the at least one laser beam impinging on the beam splitter and the separated beam generated at the beam splitter are arranged in a first plane, and at least two mirrors or lenses are arranged such that a reflected separated beam manipulated by the mirrors or lenses impinging on the superposition mirror and the separated beam reflected at the superposition mirror are arranged in a second plane, and the first plane and the second plane are perpendicular with respect to each other.

16. The EUV excitation light source according to claim 14, comprising at least two laser beam sources, wherein the laser beam sources emit laser beams having different polarizations.

17. The EUV excitation light source according to claim 1, wherein the beam guide device is configured to modify a direction of the at least one laser beam.

18. The EUV excitation light source according to claim 1, wherein the beam guide device is configured to modify a divergence of the at least one a laser beam.

19. A method for generating separated beams using an EUV excitation light source according to claim 1, comprising:
   detecting time-dependent locations of a target material for a pre-pulse and for a main-pulse;
   adjusting the beam guide device such that the respective focus of the two separated beams is located at the time-dependent locations; and
   controlling the laser beam source such that the at least one laser beam generates a first focus and a second focus at a time in which the target material is located in the time-dependent location for the pre-pulse and the main-pulse.

20. The method according to claim 19, wherein the time-dependent locations are determined empirically and the time-dependent locations are adjusted fixedly by the beam guide device.

21. The method according to claim 19, wherein the time-dependent locations are determined during operation of the EUV excitation light source and the beam guide device and the at least one laser beam source is controlled by a control device.

22. The EUV excitation light source according to claim 1, wherein the polarization phase of the two separated beams is equal with respect to the polarization of the emitted laser beam.

23. The EUV excitation light source according to claim 1, wherein both polarization portions of the laser beam obtain the same phase shifting.

24. An Extreme Ultra-Violet (EUV) excitation light source comprising:
   a laser beam source for emitting a laser beam; and
   a beam guide device for manipulating the laser beam comprising:
      a beam splitter for generating two or more separated beams from the laser beam,
      a mirror or lens for manipulating a selected one of the separated beams,
      an optical member for further manipulating the selected separated beam to form a reflected separated beam,
      a superposition mirror for superposing the reflected separated beam and another of the separated beams, and
      a focusing appliance for generating a respective focus for each of the separated beams,
   wherein the beam splitter is arranged to form a plane defined by the laser beam and one of the separated beams that is perpendicular with respect to a plane formed by the reflected separated beam and the path of the reflected separated beam as it is further reflected by the superposition mirror.

* * * * *